June 24, 1924.

M. EVANUK

FRUIT AND VEGETABLE SLICING MACHINE

Filed Aug. 9, 1923

1,499,206

Inventor
Michell Evanuk
By
Attorney

Patented June 24, 1924.

1,499,206

UNITED STATES PATENT OFFICE.

MICHAEL EVANUK, OF TOTTENVILLE, NEW YORK.

FRUIT AND VEGETABLE SLICING MACHINE.

Application filed August 9, 1923. Serial No. 656,523.

*To all whom it may concern:*

Be it known that I, MICHAEL EVANUK, a citizen of Russia, residing at Tottenville, Staten Island, in the county of Richmond and State of New York, have invented certain new and useful Improvements in Fruit and Vegetable Slicing Machines, of which the following is a specification.

This invention relates to a fruit and vegetable slicing or chopping machine, and it has for a general object the provision of a novel machine of this type characterized by simplicity and cheapness of construction.

For further comprehension of the invention, and of the objects and advantages thereof, reference will be had to the following description and accompanying drawings, and to the appended claims in which the various novel features of the invention are more particularly set forth.

Fig. 1 of the drawings is a plan view with the hopper in horizontal section showing my improved machine.

Figure 1:
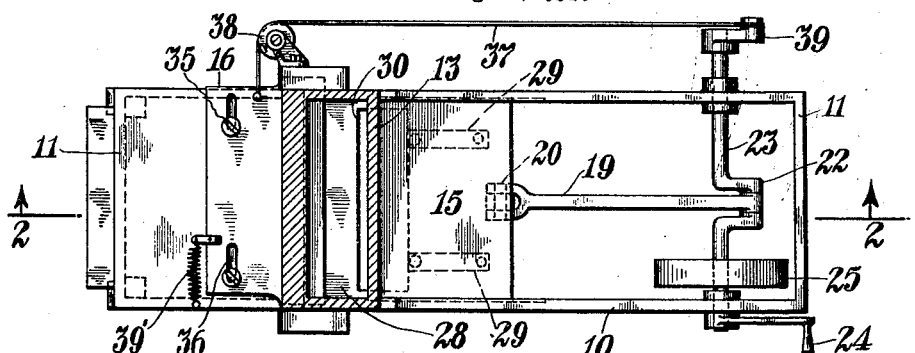
Figure 2:
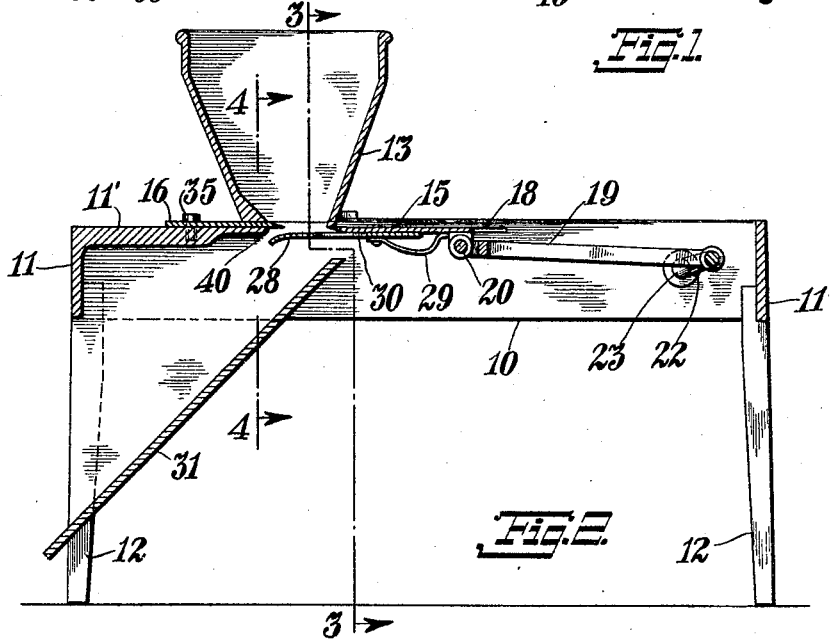
Fig. 2 is a longitudinal vertical sectional view thereof taken on the line 2—2 of Fig. 1.
Figure 3:
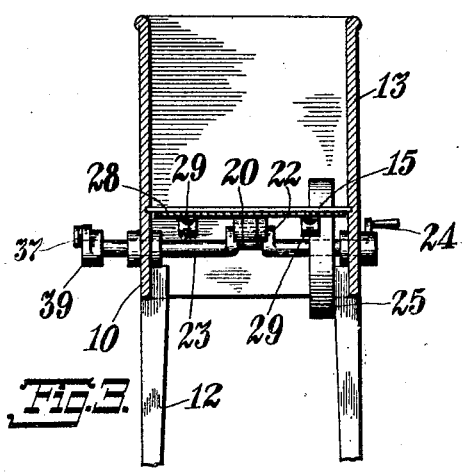
Fig. 3 is a transverse vertical sectional view taken on the line 3—3 of Fig. 2.
Figure 4:
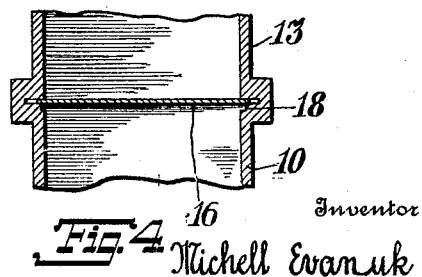
Fig. 4 is a like view taken on the line 4—4 of Fig. 2.

As here embodied my improved machine comprises an elongated rectangular frame consisting of the side boards 10 and crosspieces 11, supported on legs 12. Resting on this frame, at a point a short distance from one end thereof, is a hopper 13 to receive the fruit or vegetables being sliced. This hopper extends from side to side of the machine and the two transversely extending walls thereof incline downwardly toward one another, leaving a transversely elongated opening at the bottom of the hopper of sufficient width to receive the articles to be sliced.

The cutting is done by a pair of knives 15 and 16 respectively, which are in the form of flat blades suitably sharpened along one edge, the knife 15 being adapted to be reciprocated longitudinally of the machine. This knife is slidably held at its sides in guide grooves such as 18 formed in the inner faces of the side frame members 10, the knife being adapted for reciprocation by a rod 19 which is pivotally connected at one end as at 20 to an ear formed on the underside of the knife. The other end of this rod 19 is connected to a crank 22 on a transverse shaft 23 suitably supported in the side frame members 10 and having a crank handle 24 on one end whereby it may be manually rotated. A flywheel 25 may be mounted on the shaft 23 and it is to be understood that this shaft may be power driven if desired.

Supported by and under this knife 15 is a yieldable shelf 28 upon which the lower stratum of the material in the hopper drops after each retraction movement of the knife. This shelf is in the form of a rectangular plate of slightly less width than the knife so as to fit between the side frame members 10 and contacts with the under face of the knife being fixed to the free ends of a pair of flat springs 29 which are fixed at their other ends to the knife 15, and which press the shelf yieldingly upward against the knife. This shelf 28 projects forwardly beyond the cutting edge of the knife 15 so as to support the articles to be cut when the knife is retracted, and is provided with a transversely elongated opening 30 at some distance from its front edge through which the sliced pieces fall. These falling pieces may be received on an inclined chute 31 and directed into a suitable receptacle.

The knife 15 projects when moved forward under the other knife which I have here shown as transversely reciprocable. This latter may be guided in its transverse movement by means of pins 35 projecting through slots 36 in the knife and fixed in a top piece 11' extending between the side frame members 10. To reciprocate the knife 16 a cord 37 is attached to one end thereof and leads around a pulley 38 to a crank disk 39 on shaft 23, a spring 39' acting to move the knife oppositely to the cord 37.

It is believed that the manner of operation of my improved machine will be readily understood from the above description. The material in the hopper rests on the shelf 28 when the knife 15 is retracted and when the knife moves forward the shelf yields to accommodate the separated slices. As the knife approaches its extreme forward position these slices abut against a lip 40 extending under the other knife 16 and are caused to drop through the opening 30 as the knife completes its forward movement.

Having thus described my invention what I claim as new and desire to protect by

Letters Patent of the United States is as follows:—

1. A slicing machine comprising a frame, a hopper seated thereon, and a pair of knives adjacent the discharge opening of the hopper adapted to move at right angles to one another, and a yielding shelf carried by one of said knives to support the material in the hopper when the said last named knife is retracted.

2. A slicing machine comprising a frame, a hopper seated thereon, and a pair of knives adjacent the discharge opening of the hopper adapted to move at right angles to one another, and a yielding shelf carried by one of said knives to support the material in the hopper when the said knife is retracted, said last named shelf having an opening therein for the discharge of the sliced material.

3. In a slicing machine, a frame, a hopper supported on said frame and having a discharge opening at its lower end, a knife adapted to be reciprocated across said opening, and a yielding shelf carried by said knife to support the material in the hopper when the said knife is retracted, the said shelf projecting beyond the cutting edge of the said knife.

4. In a slicing machine, a frame, a hopper supported on said frame and having a discharge opening at its lower end, a knife adapted to be reciprocated across said opening, and a yielding shelf carried by said knife to support the material in the hopper when the said knife is retracted, the said shelf projecting beyond the cutting edge of the said knife, and having an opening therein a short distance from its front end for passage of the sliced material.

5. In a slicing machine, a frame, a hopper supported on said frame and having a discharge opening at its lower end, a knife adapted to be reciprocated across said opening, and a yielding shelf carried by said knife to support the material in the hopper when the said knife is retracted, and a number of springs fixed to said knife and pressing the said shelf upward against the latter.

In testimony whereof I have affixed my signature.

MICHAEL EVANUK.